(12) United States Patent
Park

(10) Patent No.: US 7,364,339 B2
(45) Date of Patent: Apr. 29, 2008

(54) FLEXIBLE BACKLIGHT UNIT FOR KEY OF INPUT DEVICE

(75) Inventor: Hong jin Park, Anyang-si (KR)

(73) Assignee: LS Tech Co. Ltd., Pyeongtaek-si (KR)

(*) Notice: Subject to any disclaimer, the term of this patent is extended or adjusted under 35 U.S.C. 154(b) by 72 days.

(21) Appl. No.: 11/308,631

(22) Filed: Apr. 14, 2006

(65) Prior Publication Data

US 2007/0013663 A1    Jan. 18, 2007

(30) Foreign Application Priority Data

Jul. 12, 2005    (KR) ...................... 10-2005-0062790

(51) Int. Cl.
F21V 7/04    (2006.01)

(52) U.S. Cl. .................. 362/619; 362/602; 362/24; 362/26; 345/168; 345/169

(58) Field of Classification Search .................. None
See application file for complete search history.

(56) References Cited

U.S. PATENT DOCUMENTS

| 5,746,493 A * | 5/1998 | Jonsson et al. ............. 362/602 |
| 6,926,418 B2 * | 8/2005 | Ostergård et al. ............. 362/24 |
| 2004/0130912 A1 * | 7/2004 | Miyashita ................... 362/561 |

FOREIGN PATENT DOCUMENTS

| JP | 02-265126 | 10/1990 |
| JP | 06-022017 | 1/1994 |
| JP | 06-309992 | 11/1994 |
| JP | 09-190252 | 7/1997 |
| JP | 2001-333172 | 11/2001 |
| JP | 2002-135368 | 5/2002 |
| JP | 2002-247177 | 8/2002 |
| JP | 2002-297822 | 10/2002 |
| JP | 2005-039763 | 2/2005 |
| KR | 1020000009556 | 2/2000 |
| KR | 100270881 | 8/2000 |
| KR | 1020010039294 | 5/2001 |
| KR | 1020020032677 | 5/2002 |
| KR | 1020030042723 | 6/2003 |
| KR | 1020050026741 | 3/2005 |

* cited by examiner

*Primary Examiner*—Sharon E. Payne
*Assistant Examiner*—Kristen A Manskar
(74) *Attorney, Agent, or Firm*—John K. Park; Park Law Firm

(57) ABSTRACT

Provided is a backlight unit for a key of an input device. The unit includes a light guide plate and at least one light emitting unit. The light guide plate is formed of flexible transparent resin and has a light guide pattern portion in which a plurality of engraved patterns are formed in a plurality of requirement character shapes so that light can be diffused and scattered at desired luminance from a necessary light emitting portion, using a minimal number of light sources. The light emitting unit is installed at a side wall of the light guide plate.

7 Claims, 8 Drawing Sheets

FLEXIBLE BACKLIGHT UNIT FOR KEY OF INPUT DEVICE

BACKGROUND OF THE INVENTION

1. Field of the Invention

The present invention relates to a backlight unit for a key of an input device provided for a wireless phone, a telephone, a portable digital assistant (PDA), a keyboard, and a calculator, and more particularly, to a backlight unit with a light guide plate having a characteristic in which bending is easy and having a light guide pattern portion in which a plurality of engraved patterns on a predetermined regular basis are formed in a plurality of island shapes.

2. Description of the Related Art

In general, a backlight unit which is used for a non-emissive flat panel display such as a liquid crystal display (LCD), keypad backlights of a telephone and a wireless phone, or light signboards is disclosed in Korean Patent Application Nos. 1997-73783, 1998-30060, 1999-47621, 2000-63111, and 2001-73468, and Korean Utility Model Application No. 1996-47524. In the disclosed backlight unit for a key of an input device, a plurality of light emitting diodes (LEDs) are directly disposed at each necessary part of bottom surfaces of keys to generate local light only at the necessary part, or a light emitting plate such as an organic electro luminescence light emitting diode (OLED) is installed.

In a method for directly disposing the plurality of LEDs at the bottom surfaces of the keys, the LEDs are required in number as many as the keys. Accordingly, this method has many drawbacks in cost and power consumption. In order to overcome these drawbacks, a method for suitably disposing LEDs in space between keys and lighting two or three keys by one LED without installing the LED at each key is used. However, this method has a lethal disadvantage in that constant luminance required at each key is not provided and luminance dispersion between the keys is greatly caused to thereby deteriorate product quality, and requires still many LEDs less than number of the keys.

Even in a method in which, instead of a LED, a surface light-emitting plate device such as an organic electro luminescence (EL) is disposed on a top surface of a point-contact switch, and a key is again disposed on a top surface of the resultant, there are several drawbacks such as a drawback of light efficiency of the device itself and a drawback of increase of a manufacture cost and endurance in a repeated operation.

In order to overcome the drawbacks, in a conventional backlight unit of a liquid crystal display (LCD) panel including a transparent light guide plate for transmitting light and a light emitting unit disposed on a side surface of the light guide plate, an edge light emitting method is widely used owing to its advantageous high efficiency and low price. However, in this method, since the light guide plate is of general plastic resin not bent, it is impossible that the light guide plate is used for a backlight unit of a key of an input device such as a telephone and a wireless phone. In other words, since a keypad used for a telephone and a wireless phone has a flexible bottom considering its function, when the key is pressed, the key should be pressed to the bottom to activate a point-contact switch and therefore, the light guide plate cannot be used in a conventional light guide plate method.

In the backlight unit for the key of the input device, since light emission is performed not over a total surface but over a local surface, there is a drawback in that a front light guide pattern method based on the conventional edge light emitting method is not performed at suitable efficiency.

Accordingly, in order to employ the edge light emitting method in the backlight unit of the key of the input device, it is required to use, instead of conventional solid material, flexible and transparent resin, such as relatively flexible silicone, as material of the light guide plate, and use a pattern using a particular method for enhancing light efficiency.

However, in this case, there are additional drawbacks in that it is impossible to employ a pattern installation method such as a conventional printing method due to a silicone adhesive property of an ink pattern, and it is impossible to process silicone in a scratch method due to softness of the silicone.

In a conventional method in which, in case where injection using a metal mold is applied to manufacture of the flexible light guide plate, minute protrusions are densely disposed on a surface of the light guide plate, there is a drawback in that thickness is relatively very small compared to a total area and it is difficult to obtain luminance enough to backlight the key of the input device that should concentrate light emission only on a specific character shape.

Meantime, as shown in FIG. 1, in a conventional backlight unit using an edge light emitting method, there is an advantage in that, when an embossed pattern densely disposed over a whole surface of the light guide plate 10 is used, a backlight needing a general surface light source such as a liquid crystal display can equally obtain sufficient luminance from the whole surface. However, if such surface light emission is applied as it is to the backlight unit of the key of the input device such as the telephone and the wireless phone, light generated from other parts than a necessary light emitting part such as a character part on the key are all lost. In other words, there occurs a drawback in that effectively obtainable luminance is merely a very little compared to a total amount.

In order to overcome this drawback, as shown in FIG. 2, the embossed pattern densely disposed over the whole surface of the light guide plate 10 can be grouped as a predetermined group not over the whole surface, and can be disposed in an island shape. However, in this case also, light emission can be reduced at a part other than a required position, but an amount of emitted light is not suddenly increased at a pattern part required for light emission. This is caused by the following reason. When incident light from a light emitting unit 20 passes through the light guide plate 10 and comes in contact with a light guide pattern, the incident light is diffused or scattered. In case where the light guide pattern is constructed in a plurality of island shapes forming a shape of a whole key terminal, though the light emission is generated from the shape of the whole key terminal, an amount of light capable of being actually recognized by a user through a character is limited by a shape and an area of the character.

In particular, in the light guide plate 10 for backlighting the key of the input device, a very little thickness of 500 μm or less in its product structure is required in comparison to a thickness of 1 mm or less of a conventional wireless phone light guide plate. In order to secure flexibility, the light guide plate 10 has a special property using silicone having relatively poorer transmittance than acrylic material that is material of the conventional light guide plate. Therefore, light is smoothly transmitted within the light guide plate 10. Accordingly, number of times light emitted from the light emitting unit 20 is reciprocated within the light guide plate 10 is suddenly reduced while probability of absorbing light in the light guide plate 10 itself is increased.

In other words, a three-dimensional design of pattern shape allowing the light emitted from the light emitting unit 20 to reach the light guide pattern at possible one time and be scattered is required, and a design considering circumstance where an amount of emitted light is concentrated only on a partial local portion not on a whole surface of the key in view of a characteristic of the backlight unit for the key of the input device is required.

SUMMARY OF THE INVENTION

Accordingly, the present invention is directed to a backlight unit for a key of an input device that substantially overcomes one or more of the limitations and disadvantages of the conventional art.

One object of the present invention is to provide a backlight unit for a key of an input device, in which a thin-film type flexible transparent resin such as silicone can be applied to a light guide plate, thereby securing flexibility, and in which an engraved light guide pattern portion for scattering and diffusing light can be formed on one surface of the light guide plate to provide required luminance by a minimal number of light sources, thereby reducing a cost and minimizing consumption power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a flexible backlight unit for a key of an input device, the unit including: a light guide plate formed of flexible transparent resin and having a light guide pattern portion in which a plurality of engraved patterns are formed in a plurality of island shapes, the engraved patterns having a depth on a predetermined regular basis so that light can be diffused and scattered at uniform luminance from each necessary light emitting portion of a rear of the key; and at least one light emitting unit installed at a side wall of the light guide plate.

The light guide pattern portion is formed concurrently using a minimal value of about 1/10 or less and a maximal value of about 1/3 or more in a ratio of thickness of the light guide plate to depth of the engraved pattern.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
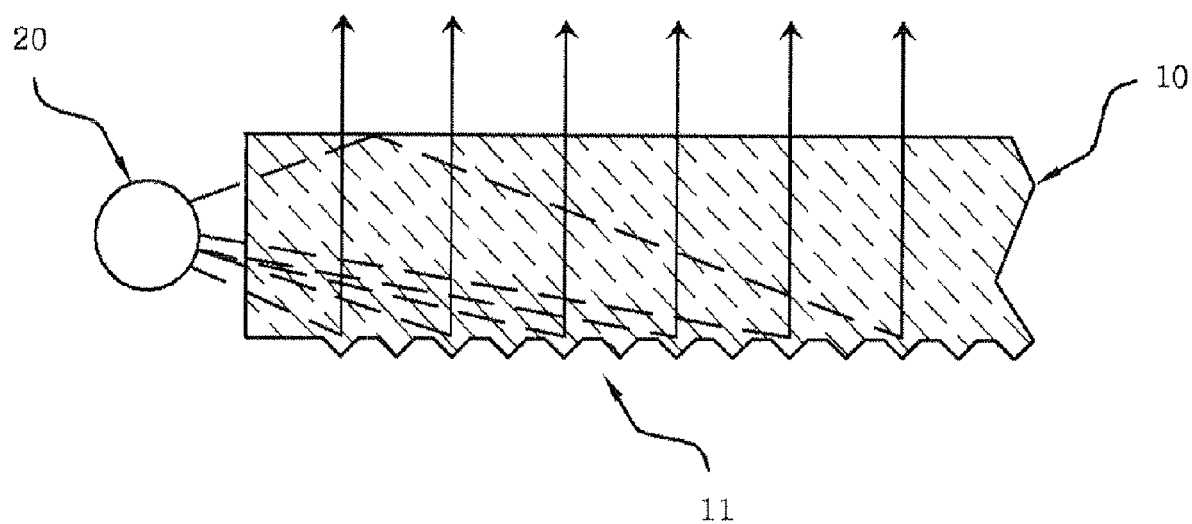
FIG. 1 is a sectional view illustrating a conventional backlight unit.
Figure 2:
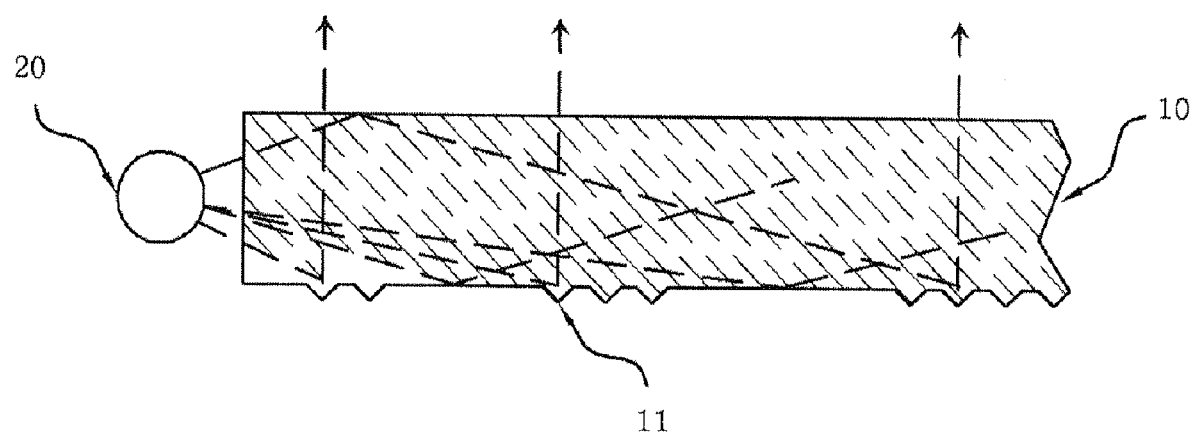
FIG. 2 is a sectional view illustrating the conventional backlight unit of FIG. 1 that is partially changed.

Reference will now be made in detail to the preferred embodiments of the present invention, examples of which are illustrated in the accompanying drawings. Wherever possible, the same reference numerals will be used throughout the drawings to refer to the same or like parts.

Figure 4:
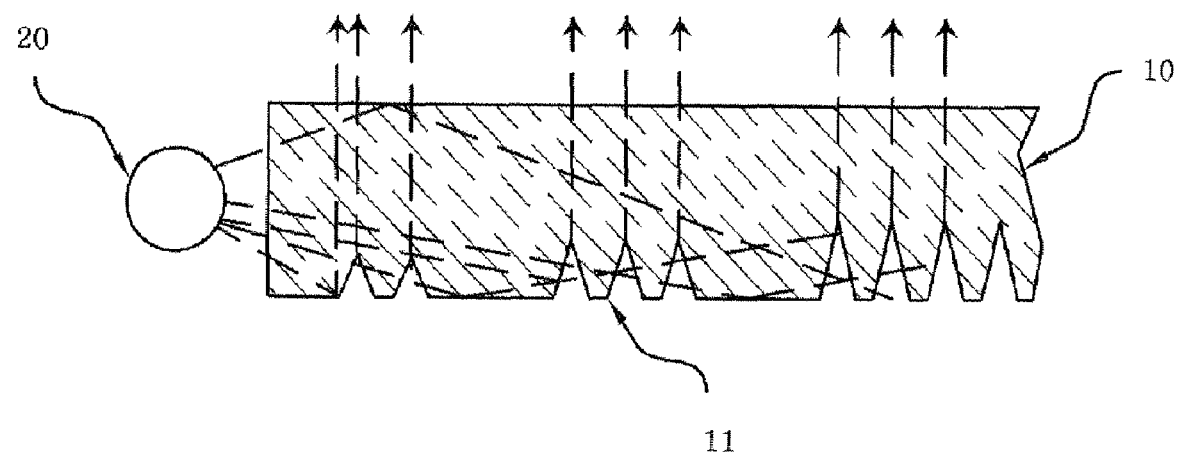
FIG. 4 is a schematic sectional view illustrating a backlight unit according to an embodiment of the present invention.

FIG. 4 illustrates a backlight unit according to an embodiment of the present invention. The inventive backlight unit includes a light guide plate 10 formed of flexible and transparent resin, having an engraved light guide pattern portion 11 formed on its base surface, and diffusing and scattering light of uniform luminance at a necessary light emitting portion; and at least one light emitting unit 20 installed at a side wall of the light guide plate 10 and irradiating light to the light guide plate 10.

The light emitting unit 20 can employ a cold cathode fluorescent lamp (CCFL) or a light emitting diode (LED).

The light guide pattern portion 11 is formed to have a predetermined engraved pattern on the base surface of the light guide plate 10. The light guide pattern portion 111 is comprised of grooves having a dot shape, a straight-line type, a rectangular shape, a matrix shape, or a combination thereof. Preferably, the light guide pattern portion 11 is formed using an injection molding or laser processing method.

In other words, the flexible and transparent resin light guide plate 10 is marked using a laser beam oscillated from a laser device, thereby forming an engraved light guide pattern portion 11 having a predetermined pattern. Or, a metal mold having an embossed light guide pattern portion 11 is used to input and mix curing agent and liquid-phase silicone in fixed amounts, and inject and mold a mixture thereof into the metal mold having the light guide pattern portion 11 in a heating and pressing method, thereby forming an embossed light guide pattern portion 11 having a predetermined pattern.

Accordingly, drawbacks of disengagement, stain, thermal deformation, and luminance reduction of the light guide pattern portion, which are caused by a conventional printing or non-printing method, can be solved. Further, when the light guide pattern portion 11 is formed, a pattern depth of a suitable condition based on a distance from the light emitting unit 20 and a thickness of the light guide plate 10 is applied so that an amount of emitted light is concentrated at a local necessary position, thereby providing the backlight unit for the key of the input device having the most efficient light emission.

Figure 3:
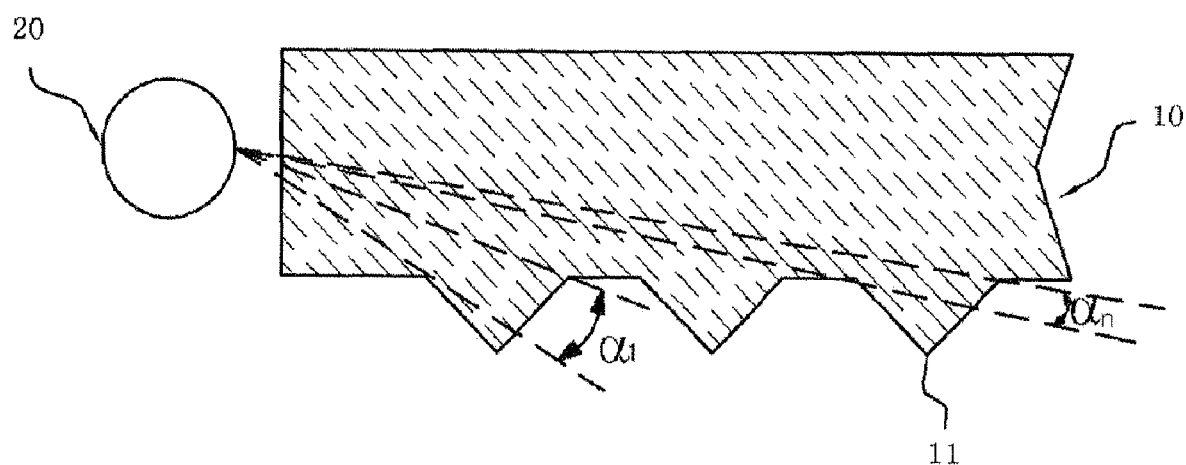
FIG. 3 is a sectional view illustrating a conventional backlight unit cut out partially, for describing a light guide system.
Figure 5:
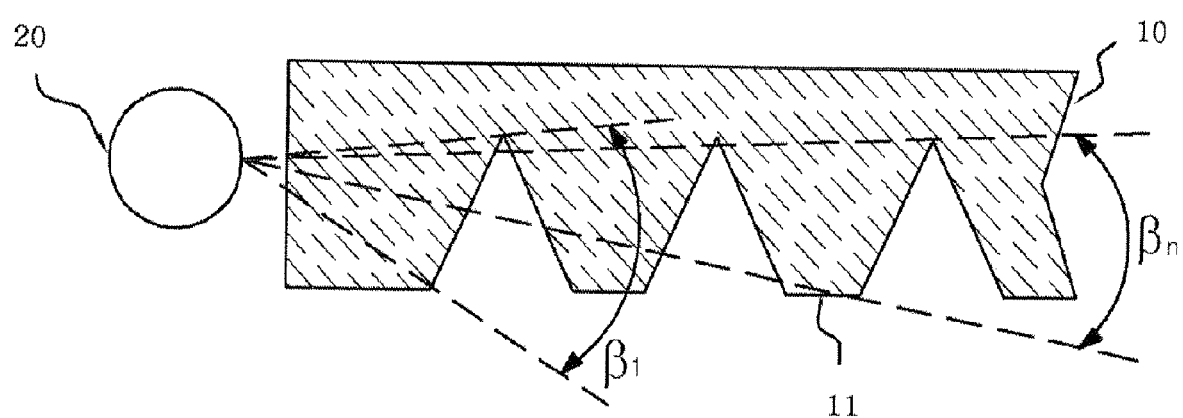
FIG. 5 is a sectional view illustrating a light guide system based on a light guide pattern portion according to the present invention.

Further, the inventive backlight unit uses the engraved pattern not a conventional embossed pattern depending on design direction described in the above conventional art, that is, a three-dimensional design of pattern shape allowing the light emitted from the light emitting unit 20 to reach the light guide pattern at possible one time and be scattered, and design direction considering circumstance where an amount of emitted light is concentrated only on a partial local portion not on a whole surface of the key in view of a characteristic of the backlight unit for the key of the input device. By doing so, probability in which the light emitted from the light emitting unit 20 reaches the pattern is abruptly increased. In other words, compared to the conventional embossed pattern where effective angles ($\alpha_1, \ldots \alpha_n$) of light incident on the pattern shape are very little as shown in FIG. 3, the engraved pattern of the present invention can provide an effect of maximizing effective angles ($\beta_1, \ldots, \beta_n$) of light incident on the pattern shape as shown in FIG. 5.

Meantime, in the present invention, when the light guide pattern portion 11 is designed, luminance improvement and uniformity securing are considered. The luminance is decided in a process of optimizing a depth of the engraved pattern and the area where the pattern portion is formed on the light guide plate 10. The uniformity is decided at a ratio of maximal value to minimal value, on a necessary light emitting portion of the light guide plate 10. The luminance should be the maximum value in view of an average value. In general, a ratio of peripheral portion to central portion, or minimal luminance to maximal luminance is required to be about 70% to 80% or more. The uniformity can be controlled by control of the depth of the engraved pattern or a pattern density of the light guide pattern portion 11.

The depth of the engraved pattern should be in a range of hundreds of micro meters, not several to tens of micro meters used in the conventional embossed pattern, and is maximally extended to 90% of a thickness of the light guide plate 10.

Figure 6:
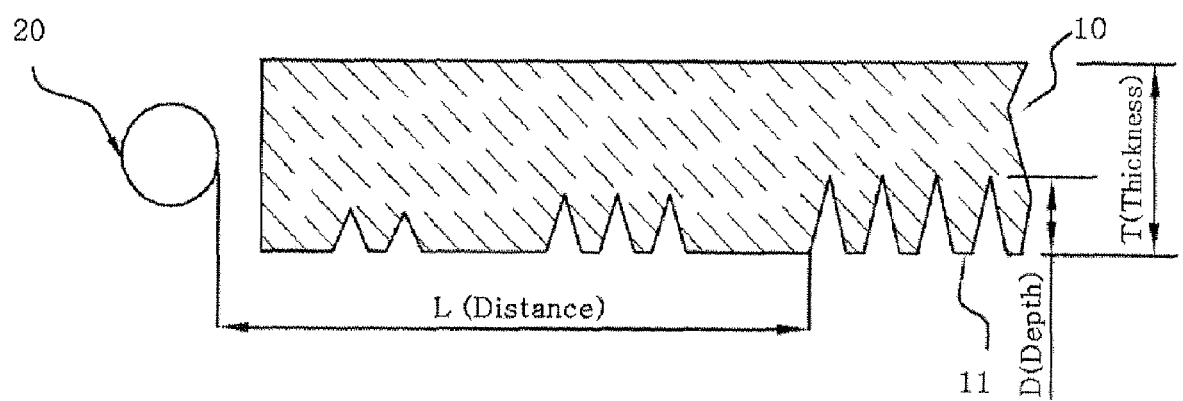
FIG. 6 is a sectional view illustrating distinguished design factors of a light guide pattern portion according to an embodiment of the present invention.

Further, when the light emitting unit 20 is minimized in size, for example, when the light emitting unit 20 is constituted of one LED, a separate design factor can be considered. Unlike a general light source, the LED has a characteristic of concentrating an amount of emitted light on a center of a light source. Therefore, accurate design cannot be accomplished by simple consideration of only a thickness (T) of the light guide pattern portion 11 and a distance (L) from the light emitting unit 20 employing the LED as shown in FIG. 6.

Figure 7:
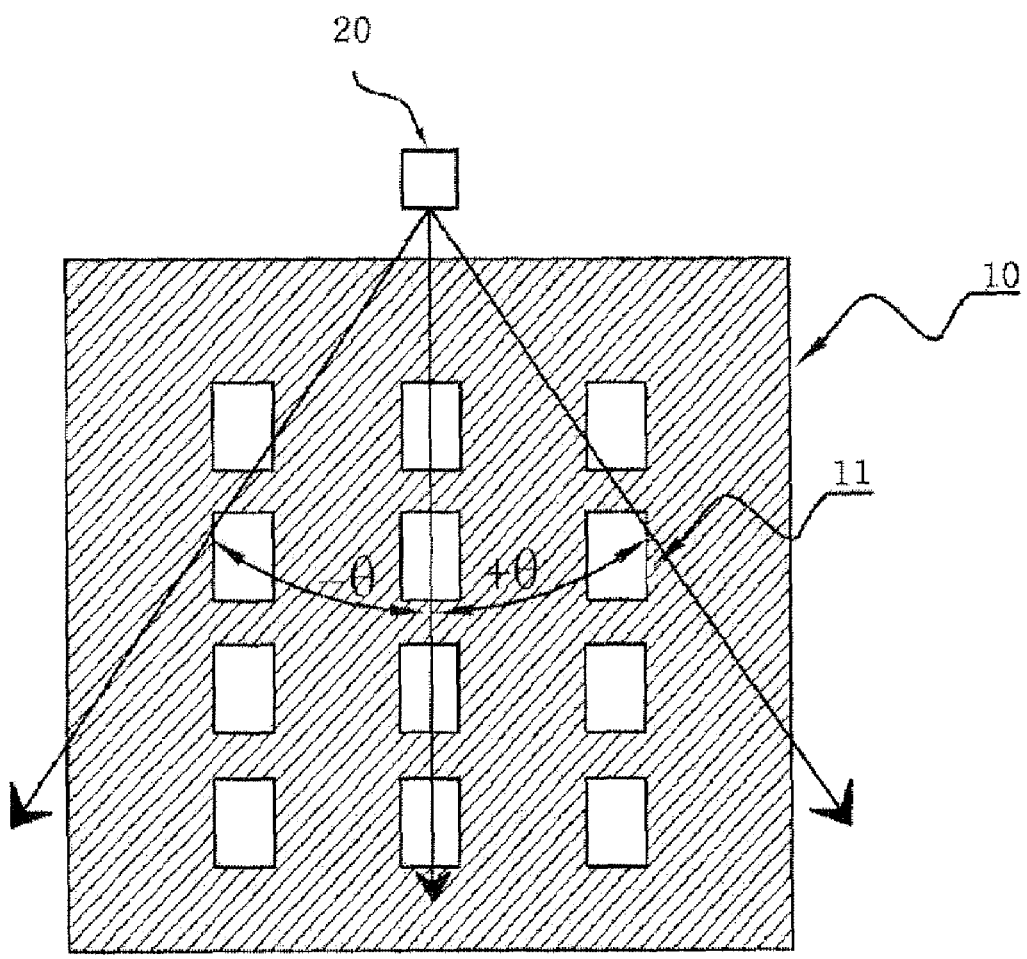
FIG. 7 is a schematic plan view illustrating light guide distribution of a light emitting device according to an embodiment of the present invention.
Figure 7:
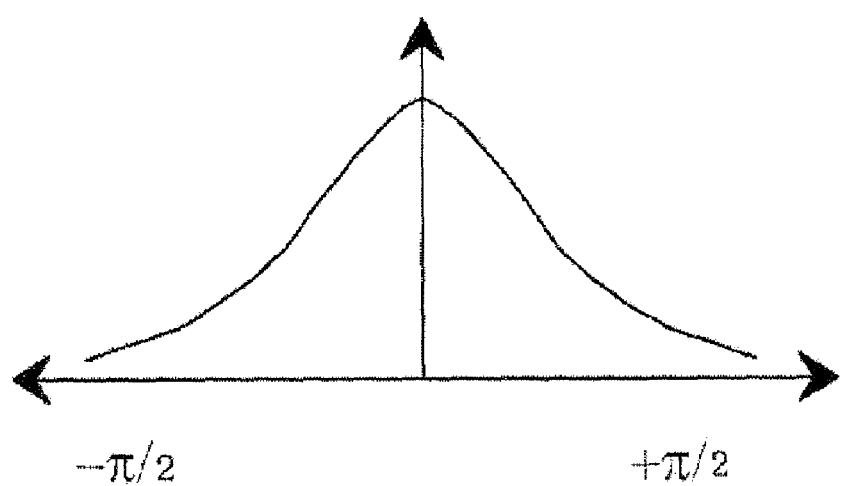

In other words, in case where the present invention considers the LED as the light emitting unit 20, in particular, in case where a minimal number of the light emitting units 20 is achieved using only one LED, when a light transmission path has a fan shape centering on an installation direction of the LED as shown in FIG. 7, a fan connected to a point where the light guide pattern portion 11 is positioned is influenced by an angle getting wider from a central line. As the angle gets larger, light received from the light emitting unit 20 gets smaller in amount. As a result, in a position widened by a predetermined angle left and right from the installation direction of the light emitting unit 20, a very small amount of light is supplied even at the same distance when compared to a central direction. Accordingly, in circumstance where other conditions are same, preferably, the engraved pattern depth of the light guide pattern portion 11 should be greater as an angle of the light guide pattern portion 11 remotely positioned from a central extension line of a light source is increased.

Figure 8:
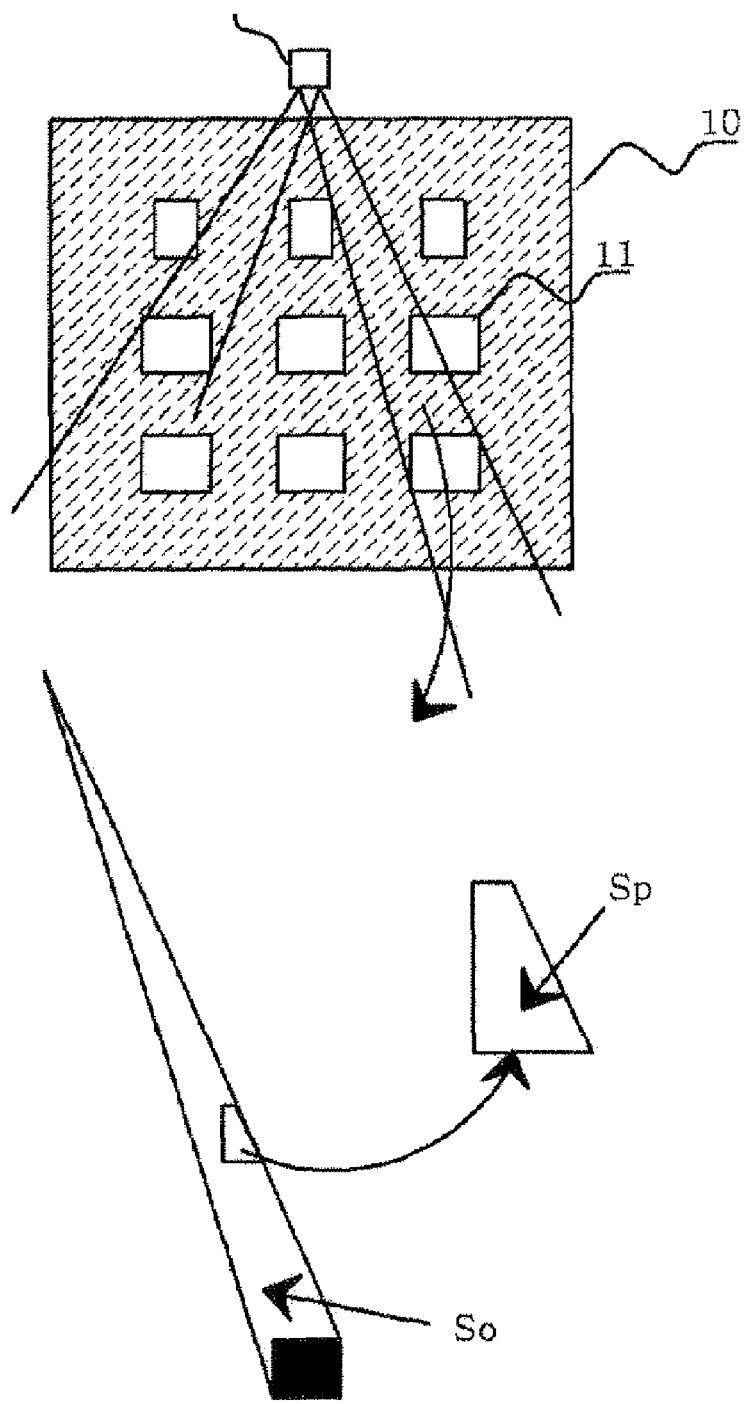
FIG. 8 is a schematic plan view illustrating distinguished design factors of a light guide pattern portion according to an embodiment of the present invention.

Further, the engraved pattern depth of the light guide pattern 11 should be different also by mutual relationship between a position of the light source and interferences of the respective light guide pattern portions 11. For example, in case where light goes straight and is transmitted to a plurality of light guide pattern portions 11 on the basis of the installation direction of the LED light source as shown in FIG. 8, it cannot be regarded that, when the light passing the plurality of light guide pattern portions 11 finally reaches the last light guide pattern portion 11, the same amount of light as that not passing other light guide pattern portions 11 reaches. In other words, an amount of light incident on the light guide pattern portion 11 at a position intended for the design according to the present invention depends on how many light guide pattern portions light passes in middle course. Accordingly, the pattern depth should be differently designed, depending on a rate of space area between the light guide pattern portion 11 and the light source to areas of other light guide pattern portions 11 positioned within the space area, by drawing an imaginary line connecting from the light source to the light guide pattern portion 11. For example, as the area rate of the other light guide pattern portions 11 provided in the space area between the light source and the light guide pattern portion 11, which is provided at the position intended for the design, is increased, the pattern depth should be larger at the light guide pattern portion 11 of the design position.

Accordingly, in consideration of the above-described design factor according to the present invention, that is, in consideration of the thickness of the light guide plate 10, the distance from the light emitting unit 20, the angle between the extension line of the central line of the light emitting unit and the imaginary line connecting from the light emitting unit to the light guide pattern portion 11, and the mutual relationship between the position of the light emitting unit 20 and the interferences of the respective light guide pattern portions 11, the engraved pattern depth (D) necessary for the light guide pattern portion 11 at the design position can be defined as Equation below:

$$S \cdot D = A \cdot T \cdot L \cdot 1/[\text{EXP}(-4.4 \cdot \theta^2)] \cdot S_0/(S_0 - S_P) \quad \text{[Equation]}$$

where,

D: Depth of engraved pattern (μm),

A: Constant value,

T: Thickness of light guide plate (mm),

L: Distance from light emitting unit (mm),

θ: Angle between the extension line of the central line of the light emitting unit and the imaginary line connecting from the light emitting unit to the light guide pattern portion (radian value: 0 to π/2), $S_0$: Space area between center of the light emitting unit and two imaginary lines connecting from the light emitting unit to the light guide pattern portion (mm$^2$), and $S_P$: Areas of other light guide pattern portions provided within space between the center line of the light emitting unit and the two imaginary lines connecting from the light emitting unit to the light guide pattern portion (mm$^2$).

The "A" has a value of about 1.3E-7 to 3.9E-2.

The shape of the light guide pattern can be provided in various patterns so that the light irradiated from the light emitting unit can be reflected, diffused, and scattered. For example, the light guide pattern can be comprised of the grooves of the dot shape, the straight-line shape, the rectangular shape, the matrix shape or the combination thereof. As it goes away from the light emitting unit, the grooves are gradually extended in number and density, thereby increasing an amount of guided light.

As described above, the inventive backlight unit using the light guide plate formed of the transparent resin having the flexibility such as silicone has a remarkable effect of providing a backlight applicable to a display requiring the flexibility.

Further, the inventive backlight unit can provide an effect of overcoming a drawback of reduction of light transmittance of the thin film typed flexible resin light guide plate, by applying the engraved pattern by the injection molding or laser processing method and using an optimal design condition based on the depth of the engraved pattern, the distance from the light emitting unit, and a pattern distribution method. By doing so, a direct type LED backlight structure applied to a product such as the backlight for the key of the input device of the telephone or the wireless phone, is changed into a side light guide type backlight structure. Accordingly, owing to reduction of number of the light sources, an effect of reduction of a manufacture cost and an effect of reducing consumption power can be accomplished at the same time.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A flexible backlight unit for a key of an input device, the unit comprising:
    a light guide plate formed of flexible transparent resin and having a light guide pattern portion in which a plurality of engraved patterns are formed in a plurality of island shapes, the engraved patterns having a depth on a predetermined regular basis so that light can be diffused and scattered at uniform luminance from each necessary light emitting portion of a rear of the key; and
    at least one light emitting unit installed at a side wall of the light guide plate,
    wherein an engraved pattern depth (D) necessary foe the light guide pattern portions is defined as in Equation below:

$$D = A \cdot T \cdot L \cdot 1/[EXP(-4.4 \cdot \theta^2)] \cdot S_0/(S_0 - S_p)$$

where,

D: Depth of the engraved pattern (μm),

A: Constant value,

T: Thickness of the light guide plate (mm),

L: Distance from the light emitting unit (mm),

θ: Angle between an extension line of central line of the light emitting unit and an imaginary line connecting from the light emitting unit to the light guide pattern portion (radian value: 0 to π/2), $S_0$: Space area between a center of the light emitting unit and imaginary lines connecting from the light emitting unit to the light guide pattern portion (mm$^2$), $S_p$: Areas of other light guide pattern portions provided within space between the center line of the light emitting unit and the two imaginary lines connecting from the light emitting unit to the light guide pattern portion (mm$^2$).

2. The unit according to claim 1, wherein the light emitting unit is comprised of at least one LED (light emitting diode).

3. The unit according to claim 1, wherein the light emitting unit is comprised of at least cold cathode fluorescent lamp.

4. The unit according to claim 1, wherein, when "T" denotes a thickness of the light guide plate, and "D" denotes a depth of an engraved pattern, it is designed that D/T has a minimal value of about 1/10 or less, and a maximal value of about 1/3 or more.

5. The unit according to claim 1, wherein the light guide plate is formed of silicone.

6. The unit according to claim 1, wherein the light guide pattern portion is formed using an injection molding method of a mixture of liquid-phase silicone and curing agent.

7. The unit according to claim 1, wherein the light guide pattern portion is formed using a laser-beam processing method.

* * * * *